United States Patent Office 2,969,388
Patented Jan. 24, 1961

2,969,388

SURFACE-ACTIVE MONOESTERS

Warren D. Niederhauser, Huntsville, Ala., assignor to Rohm & Haas Company, Philadelphia, Pa., a corporation of Delaware No Drawing. Filed Jan. 24, 1957, Ser. No. 635,934

2 Claims. (Cl. 260—485)

This invention concerns surface-active monoesters which are the reaction products of ethylene oxide and the non-volatile residues obtained in the manufacture of sebacic acid from castor oil by treatment with alkali. This invention also deals with a method for the preparation of these surface-active monoesters.

Reaction of ethylene oxide and various alcohols, amines, phenols, and monocarboxylic acids to form water-soluble polyether alcohols is known. There are thus provided non-ionic synthetic detergents. These are all characterized by the presence of a relatively large hydrocarbon group and a chain having repeating polar groups, the molecules being so constituted that definite orientation can occur. Such orientation and a balance between hydrophobic and hydrophilic parts of the molecules has been deemed necessary if useful surface activity is to be attained.

Contrary to the concepts which have thus far guided the development of synthetic detergents it has now been found that from the rather complex mixture of polycarboxylic acids which constitute the non-volatile residues obtained in sebacic acid manufacture by the caustic fusion process there can be obtained highly useful surface-active products upon reaction with ethylene oxide. The addition products thus formed have surprisingly distinctive properties which provide them with advantages over previously known non-ionic agents.

The products of this invention are prepared by reacting the said non-volatile residue acids by heating them between about 110° and 220° C., preferably 170° and 200° C., with ethylene oxide in the presence of a catalyst. Enough ethylene oxide is supplied and reacted with the said acids to supply 5 to 25 ethoxy groups per carboxy radical. Reaction with 5 to about 9 moles of ethylene oxide per carboxy radical yields oil-soluble emulsifires, while reaction with about 10 to 25 moles of ethylene oxide per carboxy radical gives water-soluble products which have wetting, dispersing, emulsifying, and cleaning properties.

In the manufacture of sebacic acid from castor oil there is a reaction between the oil and caustic alkali which is effected by heating a mixture thereof. In this reaction there are formed methyl hexyl ketone, octanol, the alkali salt of sebacic acid, and the alkali salts of various other carboxylic acids. Alcohol and ketone are readily removed from the reaction mixture by volatilization. The alkali salts which remain are then dissolved in water. The solution thereof is treated with acid. At a pH of about six an oily layer forms containing various acids, while sodium sebacate remains in solution. The term "by-product acids" is generally applied to the mixture of acids obtained as the oily layer at this stage of sebacic acid manufacture.

The by-product acids may then be separated into two parts. After they have been washed with a dilute mineral acid, such as sulfuric or hydrochloric, they may be washed with water and dried. They may then be subjected to distillation under reduced pressure. Fatty acids which are primarily long chained, monobasic carboxylic acids may be taken off at 100° to 270° C. at pressures as low as 4 mm. This treatment leaves a residue which is a mixture of carboxylic acids, primarily polybasic in character, although not necessarily exclusively so. Research work has indicated that some of these acids contain cycles, but the identity of the components of the mixture and elucidation of the complete structure of the components have not yet been possible. The non-volatile residue may be characterized as a clear, viscous, dark amber-colored oil or liquid having an acid number between 140 and 165 and an iodine number of 30 to 60, indicating some unsaturation. A 70% solution of the residue in toluene has a viscosity of about B to F on the Gardner-Holdt scale.

These non-volatile residues have been reacted by investigators in the art with glycerine and glycols to form viscous resinous masses that have polyester structures. These known compounds have structures in which the polycarboxy groups in the non-volatile residue acids react with the polyhydroxy groups of glycerine or the glycol to form straight or branched chains of polyester groupings. These known compounds always have a terminal hydroxy group and a terminal carboxy group and accordingly give appreciable acid numbers.

The compounds of the present invention are significantly distinct from the known compounds in many ways. The present compounds are made by reacting ethylene oxide with the carboxylic acids present in the defined non-volatile residue acids. The structure of the component parts of the products will vary somewhat depending on the number of carboxy groups present in the individual acids in the reactant acids. Basically, however, all component parts of the residue reactant will exhibit the same basic principle. There will be one and only one ester group present for each carboxy group and not an unlimited number of ester groups per carboxy group as contemplated by the prior art. In the present products when an individual acid contains two carboxy groups there will be just one ester group at each carboxy group, and similarly for acids containing three or more carboxy groups. It is apparent to one skilled in the art from this discussion that the compounds of this invention are fundamentally monoester in structure in that only one ester group is present for each carboxy group in the individual acids of the defined non-volatile residue acid reactants. It is in this sense that the term monoester is employed in this invention.

The present compounds have no terminal carboxy groups. This was verified by the finding that the instant products have acid numbers of zero. The compounds of this invention have a terminal hydroxyl group for each carboxy group present in each of the component reactant acids. In other words, by reacting ethylene oxide with the acids in the defined non-volatile residue reactants there is obtained a product in which each of the former carboxy groups has become an ester group terminating in a hydroxyl group. In contrast to the heavy viscous masses and resinous compositions of the prior art the compounds of this invention are oily to solid surface-active substances that are valuable emulsifiers and low or no foam detergents.

The non-volatile residue may be modified with small amounts of added monobasic acids or monobasic acids in the by-product acids may be left in the residue or added back to the residue. It is thus not essential that all of the volatile acids be stripped off. It is preferred that all of the volatile acids be stripped off. It is preferred that the residual mixture primarily of polycarboxylic acids not contain over about 20% of volatile but not removed carboxylic acids or of added carboxylic acids. Further addition of such a long-chained acid as lauric, stearic, or oleic tends to make the resulting reaction products less distinctive. Yet for emulsifying some oils or oily compositions the mixed products show advantages.

Reaction of the non-volatile residue with ethylene oxide requires a catalyst. Alkaline catalysts have been found particularly effective. An amount from 0.1% to 5% of the weight of the residue acids is suitable. As a basic catalyst there may be used sodium or potassium hydroxide, sodium or potassium carbonate, a sodium or potassium alcoholate, such as sodium methoxide, ethoxide, or propoxide, or potassium butoxide, or sodium or potassium acetate, or a fatty acid soap.

Acidic catalysts have appeared less efficient than basic catalysts. Acidic compounds found active include p-toluenesulfonic acid and boron trifluoride, particularly in the form of addition complexes with oxygenated compounds.

The reaction is carried out by adding catalyst to the non-volatile residue acids, heating these acids between 110° and 220° C., and running ethylene oxide into the catalyzed acids, under pressure if necessary. In the preferred range of temperature the rate of supply of ethylene oxide can be adjusted to the rate of consumption so that no appreciable pressure arises. Ethylene oxide is supplied until the desired proportion has been taken up. The product thus prepared is ready for use. The products made by adding from 5 to about 16 groups of ethylene oxide per carboxy group are geenrally oily liquid products at room temperature. With increasing amounts of added ethylene oxide, the products, that is from about 17 to 25 groups of ethylene oxide per carboxy group, are solids.

The compounds of this invention as well as the method for their preparation may be more fully understood from the following illustrative examples in which parts by weight are used throughout.

*Example 1*

There were charged to a pressure vessel 221 parts of the non-volatile residue from the preparation of sebacic acid from castor oil which had been stripped of material volatilizing up to 270° C. at 4 mm. and two parts of aqueous 50% sodium hydroxide solution. The vessel was flushed with nitrogen. The charge was heated to 190° C. and held at this temperature for 20 minutes. Over the course of the next four hours there were added to the reaction vessel 132 parts of ethylene oxide with the temperature maintained at 190°–200° C. The reaction mixture was cooled under nitrogen. It was subjected to reduced pressure to remove any volatile material and was filtered. The product was a dark amber, viscous oil which was soluble in toluene and was capable of emulsifying it. The product had an acid number of zero.

The batch of non-volatile residue acids used above had an acid number of 152. From this it appears that about five molar proportions of ethylene oxide were taken up per carboxyl group. The yield of product was 333 parts or 94%.

*Example 2*

There were charged to the pressure vessel 221 parts of the non-volatile residue acids having an acid number of 150 and one part of powdered potassium hydroxide. The charge was blanketed with nitrogen and heated to about 180° C. Ethylene oxide was then admitted to the vessel and added at 180°–200° C. over a five hour period, 304 parts being taken up. The reaction products were subjected to reduced pressure to remove any volatile matter and cooled under carbon dioxide. There resulted a clear, red oil in an amount of 500 parts (95% yield). It was clearly soluble in water, giving solutions of much reduced surface tension. This product has about 11 ethylene oxide units per carboxyl group. The product had an acid number of zero.

*Example 3*

There were charged to the reaction vessel 738 parts of non-volatile residue acids having an acid number of 152 and four parts of sodium methylate. The vessel was flushed with carbon dioxide and heated to about 180° C. Ethylene oxide was then run in while the temperature was held at 180°–200° C., a total of 1980 parts of ethylene oxide being taken up during five hours. The reaction product was subjected to reduced pressure, cooled under carbon dioxide, and filtered to give 2520 parts of an oil which solidified on standing. It was soluble in water and was a powerful emulsifying agent. This product contains about 22 ethylene oxide units per carboxyl group. The product had an acid number of zero.

In the same way ethylene oxide was added to other batches of the residue acids. One product was made, for instance, to have 14 ethoxy groups per carboxyl group. It was a highly effective emulsifier for compositions containing chlorinated compounds. Another product was made to contain 19 ethoxy groups per carboxyl group. It was likewise a peculiarly effective emulsifier for compositions containing chlorinated compounds, such as chlorinated dicyclopentadienes, chlorinated camphene, and solutions of bis-(chlorophenyl)trichloroethane in aromatic solvents.

*Example 4*

There were charged to a pressure vessel 220 parts of non-volatile residue acids, 28 parts of the volatile acids taken from by-product acids of sebacic acid manufacture, and 1.5 parts of powdered potassium hydroxide. The charge was blanketed with nitrogen and heated to 190° C. Ethylene oxide was introduced and with the temperature held at 190°–210° C. addition was made of 432 parts of ethylene oxide during three hours. The batch was subjected to reduced pressure and cooled under nitrogen. There was obtained a dark, but clear oil in an amount of 630 parts. It was soluble in water and was an effective emulsifier. The product had an acid number of zero.

The peculiar effectiveness of the compounds of this invention as emulsifiers may be illustrated with an example of the emulsification of a typical "emulsion concentrate" of DDT. A solution was made of 25 parts of bis(chlorophenyl)trichloroethane, 70 parts of xylene, and 5 parts of an emulsifier prepared with 12 ethoxy groups per carboxyl group. A similar composition was prepared with this emulsifier replaced with a commercial emulsifier which has ben regarded as excellent for this purpose. Portions of 20 ccs. of each composition were separately diluted with 80 ccs. of standard hard water (Navy formula). The mixtures were given 25 shakes and left standing. At 0.5 hour the top creaming from the composition containing commercial emulsifier was 1.5 ccs., while there was a mere trace at most from the composition containing the compound of this invention. At two hours the top creaming in the former case was 2.5 ccs., while there was not over 0.5 ccs. in the latter test. This application is a continuation-in-part of application Serial No. 352,989 filed May 4, 1953, now abandoned.

I claim:

1. A surface-active monoester composition which is the reaction product at 110° to 220° C. of ethylene oxide and a mixture of at least 80% of the viscous residue containing long-chained polycarboxylic acids, having an acid number between 140 and 165, having an iodine number between 30 and 60, and being the non-volatile material remaining from vacuum-distilling the by-product acids from sebacic acid manufacture from castor oil by treatment with alkali and no more than 20% of a higher aliphatic monocarboxylic acid, there being from 5 to 25 ethylenoxy groups per carboxy group, said monoester having an acid number of 0 and substantially having present only a single ester group in the chain formed from the reaction of ethylene oxide and the hydrogen atom of the carboxy group.

2. A surface-active monoester which is the reaction product at 110° to 220° C. of ethylene oxide and the viscous residue containing long-chained polycarboxylic acids, having an acid number between 140 and 165, having an iodine number between 30 and 60, and being the non-volatile material remaining from vacuum-distilling the by-product acids from sebacic acid manufacture from castor oil by treatment with alkali, there being from 5 to 25 ethylenoxy groups per carboxy group, said monoester having an acid number of 0 and substantially having present only a single ester group in the chain formed from the reaction of ethylene oxide and the hydrogen atom of the carboxy group.

References Cited in the file of this patent

UNITED STATES PATENTS

| | | |
|---|---|---|
| 2,228,929 | Reibnitz | Jan. 14, 1941 |
| 2,233,382 | DeGroote et al. | Feb. 25, 1941 |
| 2,317,688 | Cheetham et al. | Apr. 27, 1943 |
| 2,334,390 | DeGroote et al. | Nov. 16, 1943 |
| 2,476,609 | Lerner | July 19, 1949 |
| 2,606,199 | Kienle et al. | Aug. 5, 1952 |